(12) United States Patent
Van Iseghem et al.

(10) Patent No.: US 11,903,336 B2
(45) Date of Patent: Feb. 20, 2024

(54) RING ELEVATOR FOR LIFTING ROOT CROPS IN A ROOT CROP HARVESTER AND ROOT CROP HARVESTER COMPRISING SUCH A RING ELEVATOR

(71) Applicant: Dewulf NV, Roeselare (BE)

(72) Inventors: Joeri Van Iseghem, Ingelmunster (BE); Gert De Boe, Lochristi (BE)

(73) Assignee: Dewulf NV, Roeselare (BE)

( * ) Notice: Subject to any disclaimer, the term of this patent is extended or adjusted under 35 U.S.C. 154(b) by 816 days.

(21) Appl. No.: 17/015,113

(22) Filed: Sep. 9, 2020

(65) Prior Publication Data
US 2021/0092897 A1    Apr. 1, 2021

(30) Foreign Application Priority Data
Sep. 27, 2019 (EP) ..................... 19200191

(51) Int. Cl.
*A01D 33/00* (2006.01)
*A01D 17/10* (2006.01)
(Continued)

(52) U.S. Cl.
CPC ............. *A01D 33/00* (2013.01); *A01D 17/10* (2013.01); *A01D 17/12* (2013.01); *A01D 17/00* (2013.01);
(Continued)

(58) Field of Classification Search
CPC .. A01D 33/00; A01D 17/00; A01D 2017/103; A01D 17/10; A01D 17/101; A01D 17/12
(Continued)

(56) References Cited

U.S. PATENT DOCUMENTS 867,495 A * 10/1907 Gates ................... B65G 17/126
   198/562
2,751,062 A * 6/1956 Forbes ................... A01D 17/00
   198/713

(Continued)

FOREIGN PATENT DOCUMENTS

DE    1228190 B    11/1966
GB    1038831 A    8/1966

OTHER PUBLICATIONS

Search Report European Patent Application EP19200191, dated Apr. 14, 2020.

*Primary Examiner* — Thomas B Will
*Assistant Examiner* — Joel F. Mitchell
(74) *Attorney, Agent, or Firm* — FRESH IP PLC; Clifford D. Hyra; Aubrey Y. Chen (57) ABSTRACT

Disclosed herein is a ring elevator for lifting root crops in a root crop harvester, including
 a first and a second pair of endless carrying strips, each pair arranged in parallel and drivable over a closed path;
 first and second parallel transverse elements attached between and to, respectively, the first and second strips;
 flexible support elements, each attached to a first transverse element and to a second transverse element.
The first strips can be arranged around the second strips at a distance which varies along the paths between a minimum distance ($d_{min}$) and a maximum distance ($d_{max}$), and in an ascending part equals a carrier distance (c), such that the flexible support elements form baskets for receiving the root crops. The useful volume ($V_u$) in the baskets takes up at least 50% of the total volume ($V_t$) delimited by the transverse elements.

15 Claims, 8 Drawing Sheets

(51) Int. Cl.
*A01D 17/12* (2006.01)
*A01D 17/00* (2006.01)

(52) U.S. Cl.
CPC ...... *A01D 17/101* (2013.01); *A01D 2017/103* (2013.01)

(58) Field of Classification Search
USPC .......................................... 171/138; 198/715
See application file for complete search history.

(56) References Cited

U.S. PATENT DOCUMENTS

| | | | | |
|---|---|---|---|---|
| 2,753,979 | A | * | 7/1956 | Blackman ............ B65G 17/126 198/708 |
| 2,828,002 | A | | 3/1958 | Sawrie |
| 2,956,668 | A | * | 10/1960 | Fioravanti .............. B65G 47/00 198/715 |
| 3,741,372 | A | * | 6/1973 | Hewitt ............... G03G 15/0801 198/715 |
| 4,333,561 | A | | 6/1982 | Schlegel |
| 4,842,076 | A | * | 6/1989 | Welp .................... A01D 17/101 171/126 |
| 5,660,266 | A | * | 8/1997 | Nolte ..................... B65G 15/42 198/701 |
| 6,267,226 | B1 | | 7/2001 | Jarmain |

* cited by examiner

Fig. 1 STATE OF THE ART

Fig. 2 STATE OF THE ART

Fig. 7 STATE OF THE ART

Fig. 8

Fig. 9 STATE OF THE ART

RING ELEVATOR FOR LIFTING ROOT CROPS IN A ROOT CROP HARVESTER AND ROOT CROP HARVESTER COMPRISING SUCH A RING ELEVATOR

This application claims the benefit of European Patent Application No. EP19200191.5, filed Sep. 27, 2019, which is hereby incorporated by reference in its entirety.

FIELD OF THE DISCLOSURE

This disclosure relates to a ring elevator for lifting root crops in a root crop harvester, the elevator comprising:
- a first pair of endless carrying strips, belts, chains or the like, arranged in parallel, which are drivable over a first closed path;
- a second pair of endless carrying strips, belts, chains or the like, arranged in parallel, which are drivable over a second closed path;
- first parallel transverse elements attached between and to the first strips, belts, chains or the like;
- second parallel transverse elements attached between and to the second strips, belts, chains or the like; and
- flexible support elements, each attached to a first transverse element and to a second transverse element;
- the first strips, belts, chains or the like being arranged around the second strips, belts, chains or the like at a distance, which, when in use, varies along the paths between a minimum distance and a maximum distance, in an ascending part of the paths equals a carrier distance, between the minimum distance and the maximum distance, such that the flexible support elements form baskets for receiving the root crops.

The first strips, belts, chains or the like are arranged around the second strips, belts, chains or the like in a sense that the first closed path is wider than the second closed path in the horizontal direction. The distance between the first strips, belts, chains or the like can be chosen larger (such that the first strips, belts, chains or the like are placed on both sides of the second strips, belts, chains or the like), equal or smaller than the distance between the second strips, belts, chains or the like (such that the second strips, belts, chains or the like are placed on both sides of the first strips, belts, chains or the like).

The ring elevator to which the present disclosure relates, is of a type which is suitable for lifting root crops in a root crop harvester. The root crops are unloaded inside the root crop harvester by this ring elevator, this typically on a discharge conveyor. Such an elevator may however also be used to lift root crops towards a bunker in the root crop harvester or towards further conveyors in this root crop harvester, for e.g. transferring the root crops to a transfer elevator for dropping the root crops into a truck or trailer. Alternatively, these root crops can be transported to a big-bag or a box or a bag or dropped on the ground.

With such a ring elevator, the root crops are unloaded somewhere inside of the root crop harvester by this elevator.

Figure 1:
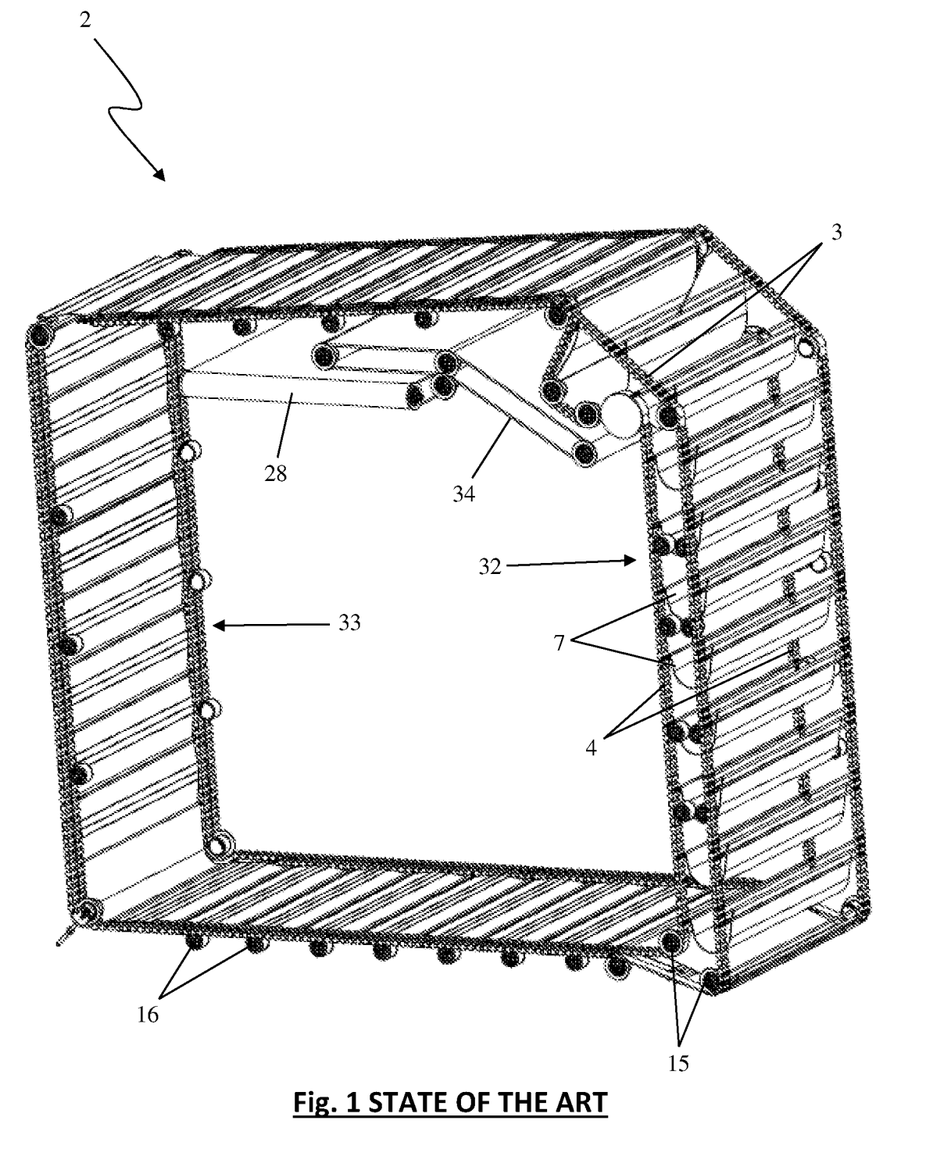
FIG. 1 shows an example of a ring elevator of the state of the art illustrated in perspective.
Figure 2:
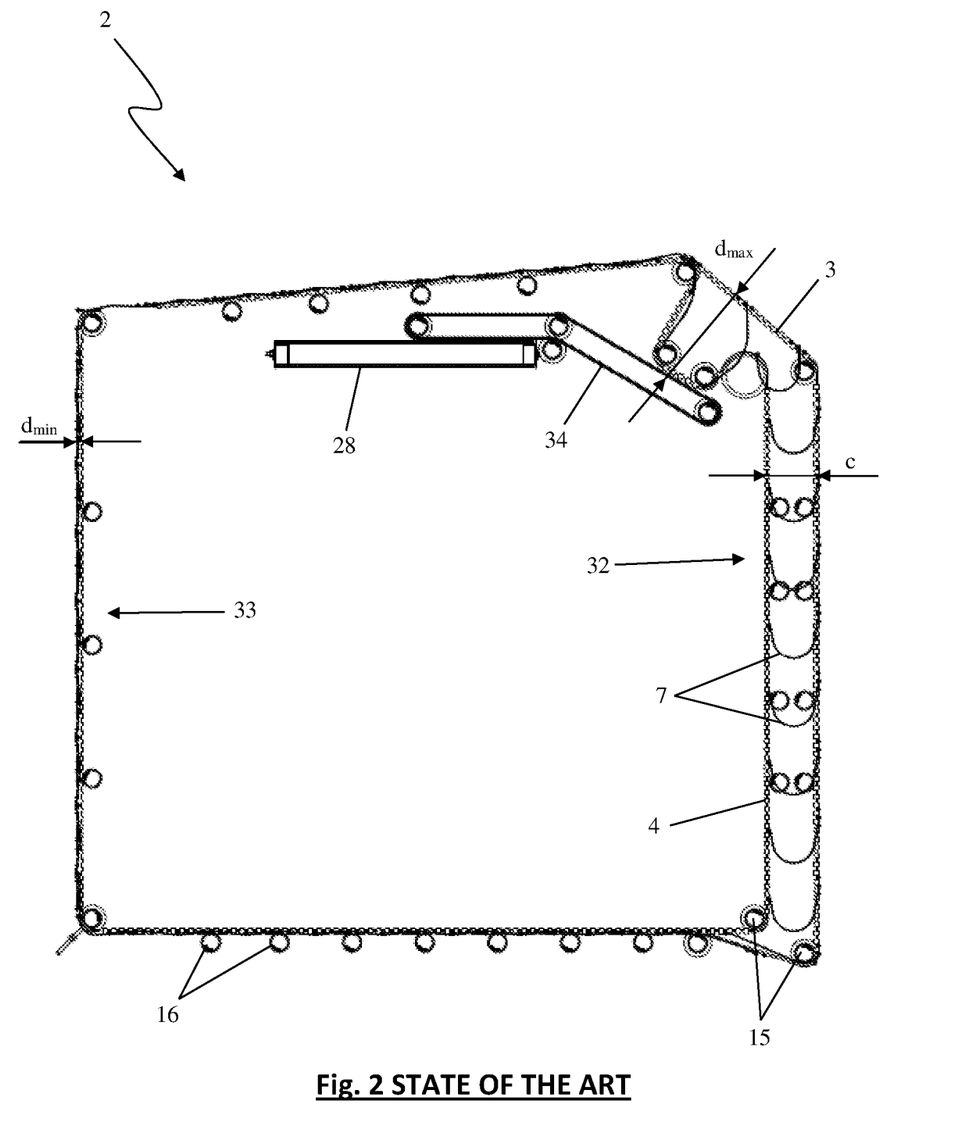
FIG. 2 shows the ring elevator of FIG. 1 illustrated in back view.

An example of a ring elevator to which the disclosure relates, is e.g. distributed by Ploeger in the root crop harvesters with the names AR 3 BX and AR 4 BX and is illustrated in FIGS. 1-2 of the present patent application.

In addition, this disclosure concerns a root crop harvester, comprising such a ring elevator for lifting root crops.

More specifically, this disclosure concerns a potato harvester. However, a harvester according to some embodiments of this invention can also be used for the harvesting of other root crops such as tubers or roots, etc.

Such harvesters can range from machines towed by a tractor or carried on a tractor to self-propelled vehicles.

Such a harvester comprises a crop-digger section, which typically comprises one or more harvesting shares for the harvesting of root crops. A sieving unit, comprising transport and/or cleaning devices is placed downstream of these harvesting shares and upstream of such a ring elevator, in order to transport the root crops and, in the meantime, to sieve the dirt from the harvested root crops. Dirt to be sieved includes typically foliage, stones, earth residues, etc.

The ring elevator to which this disclosure relates, is the bottleneck inside such harvester with regard to achieving the desired capacity. The crop-digger section (e.g. harvesting shares) is preferably positioned over the entire width of the harvester, but the harvested volume can then not efficiently be transferred to the elevator.

BACKGROUND

At first sight, it seems easily possible to adapt the depth of a ring elevator (or in other words, the distance between the carrying strips and the corresponding volume of the baskets). However, then an additional spreading device is typically required between said sieving unit and to distribute the root crops over the full depth of the elevator.

Such a spreading device however has a considerable weight. Known spreading devices can have a weight of around 400 kg. When increasing the capacity of such a root crop harvester, such an additional weight is to be avoided. For 3-axle agricultural vehicles in road traffic, the weight of the machine must be limited to a maximum of 26 tons in unloaded condition, in order to be approved for use in Belgium. In addition, the weight on each driven axle in unloaded condition is to be limited to maximally 11.5 tons.

An alternative solution could be found in accelerating the ring elevator. This is however impossible without compromising the quality of the root crops.

SUMMARY

It is an object of some embodiments of the present invention to provide an alternative solution to increase the capacity of such a root crop harvester.

This object may be achieved by providing a ring elevator for lifting root crops in a root crop harvester, the elevator comprising:
- a first pair of endless carrying strips, belts, chains or the like, arranged in parallel, which are drivable over a first closed path;
- a second pair of endless carrying strips, belts, chains or the like, arranged in parallel, which are drivable over a second closed path;
- first parallel transverse elements attached between and to the first strips, belts, chains or the like;
- second parallel transverse elements attached between and to the second strips, belts, chains or the like; and
- flexible support elements, each attached to a first transverse element and to a second transverse element;
- the first strips, belts, chains or the like being arranged around the second strips, belts, chains or the like at a distance, which, when in use, varies along the paths between a minimum distance and a maximum distance, and in an ascending part of the paths equals a carrier distance, between the minimum distance and the maximum distance, such that the flexible support elements form baskets for receiving the root crops, wherein in said ascending part the useful volume in the baskets for receiving the root crops takes up at least 50% of the total volume delimited by the transverse elements.

The strips can start rising in the respective paths before said ascending part and can keep on rising thereafter. Said ascending part is a part of said paths wherein said strips are rising and wherein the said distance equals the carrier distance.

The strips preferably extend substantially vertically in said ascending part.

When looking at the total volume delimited by the transverse elements in this ascending part, then part of said total volume can be filled with root crops, i.e. the useful volume.

Said total volume is thereby per basket delimited by a plane through the transverse elements to which said basket it attached, a plane through the transverse elements to which the basket hanging just below it is attached, a plane through the first transverse elements to which both these baskets are attached and a plane through the second transverse elements to which both these baskets are attached. When the baskets are identical, this total volume equals the volume delimited between a basket, the basket hanging just below it, the plane through the first transverse elements to which these baskets are attached and the plane through the second transverse elements to which these baskets are attached. The sum of these theoretical total volumes of all the (parts of) baskets extending in said ascending part together form said total volume.

Theoretically, said useful volume, fillable with root crops is per basket delimited by said basket, freely hanging downwards, a plane through the transverse elements to which this basket is attached, which transverse elements are placed at said carrier distance from each other, and, in case the basket just below it extends up to above the lowest point of this basket hanging down, a plane through the transverse elements to which the basket just below it is attached, which transverse elements are placed at said carrier distance from each other. When the baskets are identical, this is the volume delimited by said basket, freely hanging downwards and a plane through the transverse elements to which this basket is attached, minus the volume which a basket placed just above it and also freely hanging downwards, will possibly occupy therein. The sum of these theoretical useful volumes of all the (parts of) baskets extending within the total volume together form said useful volume.

In most cases, besides said useful volume there will normally also be a volume delimited by the baskets and the transverse elements, which will not be fillable with root crops.

By assuring that the useful volume takes up at least 50% of the total volume, the capacity of such an elevator and therefore of a root crop harvester comprising such an elevator can be largely increased with respect to the prior art.

Even more preferably, the useful volume takes up between 50% and 76% of the total volume.

In zones of a further optimized embodiment of a ring elevator according to the invention, where the distance between the first strips, belts, chains or the like and the second strips, belts, chains or the like equals the minimum distance, one flexible support element is entirely overlapped with other flexible support elements. Preferably, minimum three flexible support elements overlap each other over part of their length.

Possible perforations in the support elements are not taken into account for this overlap.

In a descending part of the paths of a further preferred embodiment of a ring elevator according to the invention, the distance between the first strips, belts, chains or the like and the second strips, belts, chains or the like equals the minimum distance. Preferably then, in an increasing zone of the paths situated between the descending part and the ascending part, the distance between the second strips and the first strips increases from the minimum distance towards an underlying distance, this underlying distance being the maximum distance wherein the first strips are situated below the second strips between the said descending part and the said ascending part.

The strips can start descending in the respective paths before said descending part and can keep on descending thereafter. Said descending part is a part of said paths wherein the said distance equals the minimum distance.

The strips preferably extend substantially vertically in said descending part.

The second strips, belts chains or the like begin to rise towards the ascending part in an ascending point of the second path.

By means of such an increasing zone, baskets start being formed before the ascending part and can start being filled with root crops at a certain distance before this ascending part.

Preferably, it is thereby assured that a major part of the root crops can already enter into the partially formed baskets before the ascending part.

In this respect, said increasing zone is preferably starting at a formation distance of the ascending point, this formation distance being:
   at least the length of the carrier distance; and/or
   at least the length of one of the flexible support elements; and/or
   at least the length of the loading zone; and/or
   at least the distance between two adjacent second parallel transverse elements.

Preferably, the increasing zone starts immediately after the descending part.

Alternatively or additionally, it is in this respect preferably assured that in the second path, the second strips, belts, chains or the like begin to rise towards the ascending part in an ascending point of the second path, and that the increasing zone is situated in the paths before the ascending point.

Preferably, the increasing zone ends when the first strips, belts, chains or the like begin to rise towards the ascending part in an outer point of the first path, and that the increasing zone is situated in the paths before the outer point.

A ring elevator according to at least one embodiment of the invention furthermore comprises a loading zone, for loading root crops on the flexible support elements, which loading zone is situated before the ascending point. The first strips preferably descend towards the ascending point in at least part of this loading zone, such that the drop height of root crops falling from a feeding unit onto the ring elevator is limited.

The points of such feeding units, where root crops can fall from such a feeding unit will typically be situated at mainly the same height.

The drop height is the height of which a root crop is falling in the air. The filling height is the height between the feeding unit and the underlying part which is not a root crop.

In the loading zone of the elevator, there are no root crops yet at one side of the feeding unit but further (closer to the other side of the feeding unit) there are root crops.

When the feeding unit and the loading zone are both horizontal, there is a big drop height for the root crop in the beginning of the loading zone. When the feeding unit is horizontal, but the loading zone is descending, the root crops have almost the same low drop height over the entire loading zone.

These first strips, belts, chains or the like preferably descend gradually over the loading zone such that there is a smooth transition in the drop height of the root crops. Even more preferably these first strips, belts, chains or the like descend gradually over the full length of the loading zone.

Alternatively and/or additionally, the distance between the first strips, belts, chains or the like and the second strips, belts, chains or the like preferably also increases gradually in the increasing zone in order to reduce this drop height. Even more preferably this distance increases gradually over the full length of this increasing zone.

Preferably the length of the increasing zone is:
at least the length of the carrier distance; and/or
at least the length of one of the flexible support elements; and/or
at least the length of the loading zone; and/or
at least the distance between two adjacent second parallel transverse elements.

The increasing zone preferably already ends at the height of the ascending point, such that the partially formed baskets can maximally be filled before the ascending part.

A ring elevator according to at least one embodiment of the invention furthermore comprises an unloading zone, for unloading root crops from the flexible support elements.

In the second path, after said ascending part, the second strips, belts, chains or the like preferably keep rising slant towards the unloading zone in a slanted zone. The second strips, belts, chains or the like then preferably rise up to an unloading point, in such a way that root crops remain in the flexible support elements as long as the second strips, belts, chains or the like rise. The first strips, belts, chains or the like could even rise further on.

By making the strips rising slant towards the unloading zone in such a way that root crops still remain in the flexible support element, a conveyor belt can be spared in order to discharge the root crops, such that such elevator can be made cheaper and with a reduced weight. This also has advantages in ring elevators which do not have previously mentioned features of at least one embodiment the invention.

The width of the slanted zone is preferably:
at least the carrier distance; and/or
at least the length of one of the flexible support elements; and/or
at least the length of the loading zone; and/or
at least the distance between two adjacent second parallel transverse elements.

In a preferred embodiment of a ring elevator according to the invention all parallel transverse elements have one of said flexible support elements attached thereto, in order to reduce the total weight of such a ring elevator.

Furthermore, in the ascending part, for each flexible support element, the second transverse element to which this flexible support element is attached, is preferably situated lower than the first transverse element to which this flexible support element is attached. In this way, there is less chance that root crops can fall out of the elevator on the outside. When they fall out of the elevator on the inside, they will fall back on the flexible support elements in the elevator itself.

The object of this disclosure is also achieved with a root crop harvester, comprising a ring elevator according to at least one embodiment of the invention as previously described.

In a preferred embodiment, such root crop harvester comprises a feeding unit for feeding root crops towards the ring elevator, wherein in a slope zone at the height of the feeding unit, at least one of the strips, belts, chains or the like which is situated furthest from the sieving unit is situated lower than the corresponding strip, belt, chain or the like which is situated closest to the sieving unit, in order to reduce the drop height of the root crops to a minimum and to assure an optimal filling of the baskets.

A root crop harvester according to at least one embodiment of the invention additionally comprises a discharge conveyor for receiving the root crops from the ring elevator.

This discharge conveyor is preferably positioned under an angle with respect to the travel direction of the root crop harvester, such that a better distribution over the discharge conveyor can be obtained and so that the second strips, chains, belts or the like do not have to rise too far slant towards the unloading zone in order to save a conveyor belt as described above. Said angle is preferably an acute angle.

Such positioning of the discharge conveyor also has advantages in root crop harvesters which do not have previously mentioned features of at least one embodiment of the invention.

Alternatively or additionally, seen in a discharge direction, wherein the ring elevator feeds the root crops on the discharge conveyor, at a first side of the ring elevator the discharge conveyor is preferably positioned below the second strips, belts or the like, higher than at the second side of the ring elevator, downstream the first side.

In this way, the drop height for the root crops falling onto the discharge conveyor is limited, similarly as described here above when the feeding unit is horizontal, but the loading zone is descending.

This also has advantages in ring elevators which do not have previously mentioned features of at least one embodiment of the invention.

BRIEF DESCRIPTION OF THE DRAWINGS

The present invention will now be explained in more detail by means of the following description of a harvester according to some embodiments of the present invention. The sole aim of this description is to give explanatory examples and to indicate further advantages and particulars of the present invention, and can thus by no means be interpreted as a limitation of the area of application of the invention or of the patent rights defined in the claims.

In this description, reference numerals are used to refer to the attached drawings, in which.

DETAILED DESCRIPTION

In this application, the length of the elevator (2) is the dimension of the elevator (2) in the length or travel direction (Y) of the root crop harvester (1) in which it is installed, the width of the elevator (2) is the dimension of this elevator (2) in a horizontal direction (X) perpendicular to this travel direction (Y) of the root crop harvester (1) in which it is installed and the height of the elevator (2) is the dimension of this elevator (2) in a vertical direction (Z) of the root crop harvester (1) in which it is installed.

Figure 3:
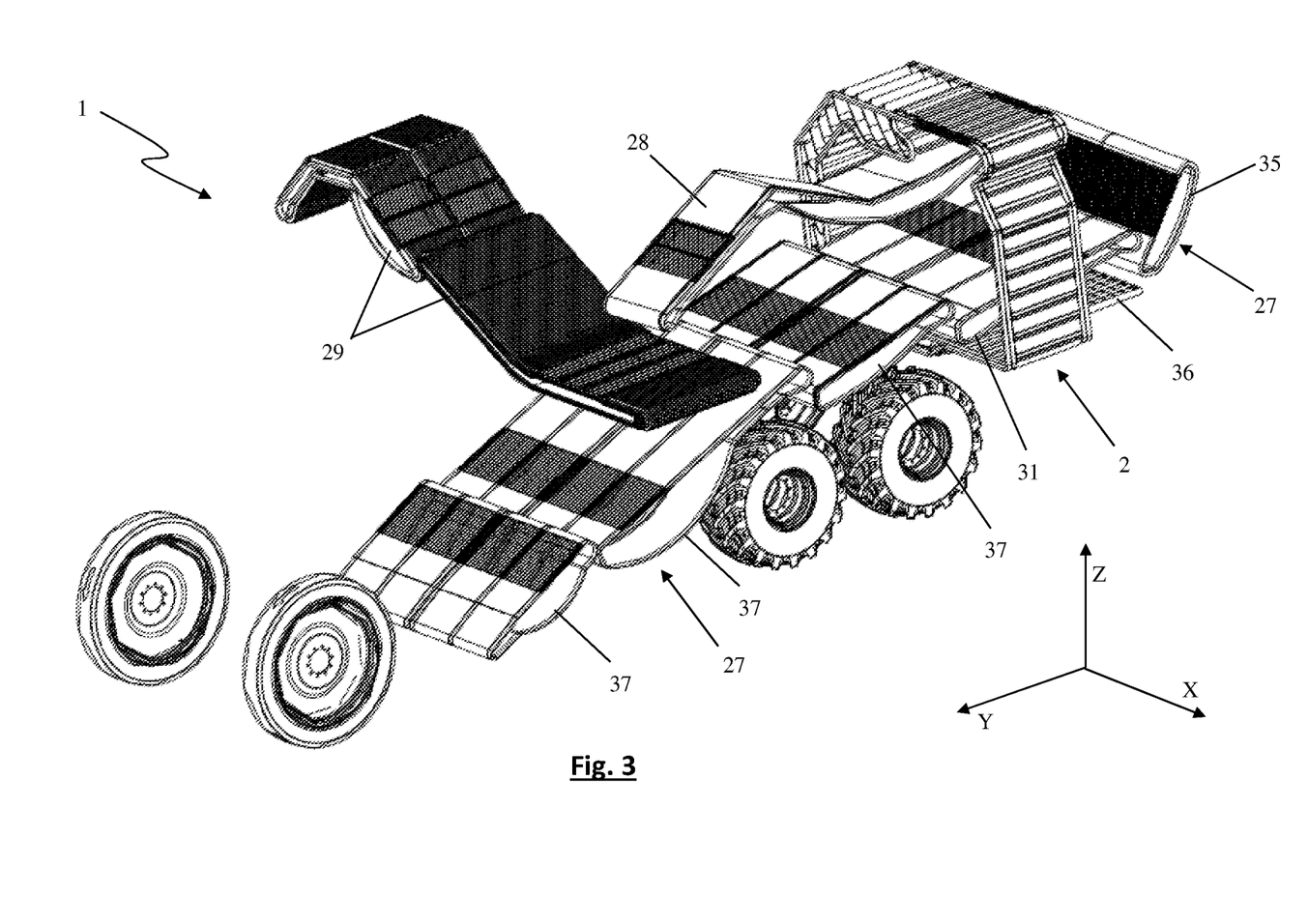
FIG. 3 shows parts of a root crop harvester, comprising a ring elevator according to some embodiments of the invention and are schematically illustrated in perspective.

FIG. 3 illustrates a possible position of a ring elevator (2) in a root crop harvester (1). Such a root crop harvester (1) comprises a crop-digger section with e.g. one or more harvesting shares, which are not illustrated. A sieving unit (27), comprises sieving conveyors (37), a feeding conveyor (31), a pintle belt (35) and axial rollers (36). This sieving unit (27) is positioned downstream of the harvesting shares for transporting root crops (8) towards the ring elevator (2) and in the meantime, to sieve dirt from the harvested root crops (8). With the elevator (2), the root crops (8) are then lifted towards a discharge conveyor (28) onto a transfer elevator (29). The feeding conveyor (31) preferably does not have a sieve function when passing through the ring elevator (2).

Other configurations are of course conceivable wherein e.g. the root crop harvester (1) is provided with a bunker instead of a transfer elevator (29) and/or without axial rollers (36), and/or without pintle belt (35) and/or with the ring elevator (2) being positioned fully at the back of the root crop harvester (1), and/or with additional or less conveyors (28, 29, 31, 34, 37) and/or other transfer means etc.

The parts of the harvester machine (1) besides the ring elevator (2) can be of any known design.

In FIGS. 1-2, 7 and 9, a ring elevator (2) of the prior art is illustrated.

Both this ring elevator (2) of the prior art and the illustrated embodiment of a ring elevator (2) according to the invention (FIGS. 3-6, 8 and 10) comprise:
  a first pair of endless carrying strips (3), belts, chains or the like, arranged in parallel, which are drivable over a first closed path;
  a second pair of endless carrying strips (4), belts, chains or the like, arranged in parallel, which are drivable over a second closed path;
  first parallel transverse elements (5) attached between and to the first strips (3), belts, chains or the like; and
  second parallel transverse elements (6) attached between and to the second strips (4), belts, chains or the like.

The closed paths are defined by driving rollers (14), deflection rollers (15) and carrying rollers (16) onto which the strips (3, 4) are arranged and pass while being driven.

The transverse elements (5, 6) may include bars and/or slats and/or profiles and/or tubes and can be made of metal or plastic. If necessary, they can be provided with a cover. In addition, they can also be provided with one or more indentations.

It is preferable to use transverse bars (5, 6) that are riveted to the strips (3, 4), belts, chains or the like, as this provides a strong connection.

Flexible support elements (7) are each attached to a first transverse element (5) and to a second transverse element (6).

These flexible support elements (7) may e.g. be made of plastic. These may be attached to the transverse elements (5, 6) as in the prior art, or as described in BE 2019/5181.

Although an elevator (2) to which at least one embodiment of the invention relates does not have a sieving function, it is possible to provide such flexible support elements (7) with perforations, this primarily in order to reduce weight of the ring elevator (2).

In the elevator (2) according to the state of the art, additional transverse elements (5, 6) are provided, to which no flexible support elements (7) are attached. This is also possible with elevators (2) according to at least one embodiment of the invention. In order to reduce the weight of the ring elevator (2), it is however preferable, not to have such additional transverse elements (5, 6), this as in the illustrated elevator (2) according to at least one embodiment of the invention.

The first strips (3), belts, chains or the like are arranged around the second strips (4), belts, chains or the like in such a way that the flexible support elements (7) form baskets for the transport of the root crops (8) in an ascending part (32) of their path and are stretched out to save space in a descending part (33) of their path, where the root crops (8) do not have to be transported. The strips (3, 4) are therefore positioned at a distance, which, when in use, varies along the paths between a minimum distance ($d_{min}$) and a maximum distance ($d_{max}$).

In an ascending part (32) of the paths, the distance between the strips (3, 4), belts, chains or the like, equals a carrier distance (c), for forming the baskets (7) for receiving the root crops (8).

The second strips (4), belts, chains or the like begin to rise towards the ascending part (32) in an ascending point (9) of the second path.

In a descending part (33) of the paths, the distance equals said minimum distance ($d_{min}$).

The ring elevator (2) comprises a loading zone (10), situated before the ascending point (9), for loading root crops (8) on the flexible support elements (7) and an unloading zone (11), situated after the ascending part (32), for unloading root crops (8) from the flexible support elements (7).

In the illustrated embodiment, the distance between the first strips (3), belts, chains or the like is larger than the distance between the second strips (4), belts, chains or the like. The first strips (3), belts, chains or the like are thus placed on both sides of the second strips (4), belts, chains or the like. It is however also possible to position the first strips (3), belts, chains or the like at a smaller distance than the second strips (4), belts, chains or the like, such that the second strips (4), belts, chains or the like are placed on both sides of the first strips (3), belts, chains or the like.

Figure 4:
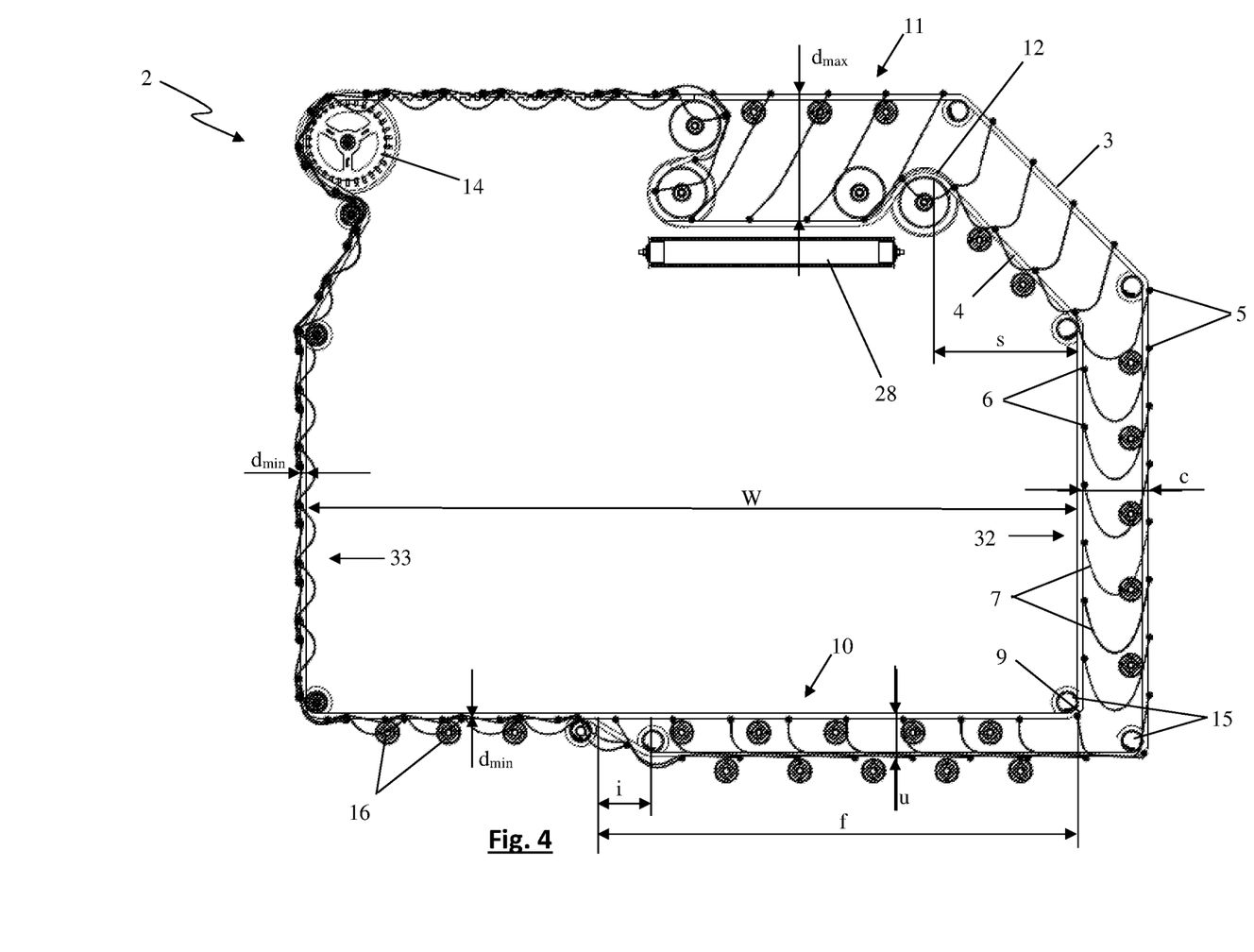
FIG. 4 shows the ring elevator of the root crop harvester of FIG. 3 illustrated separately in back view.
Figure 5:
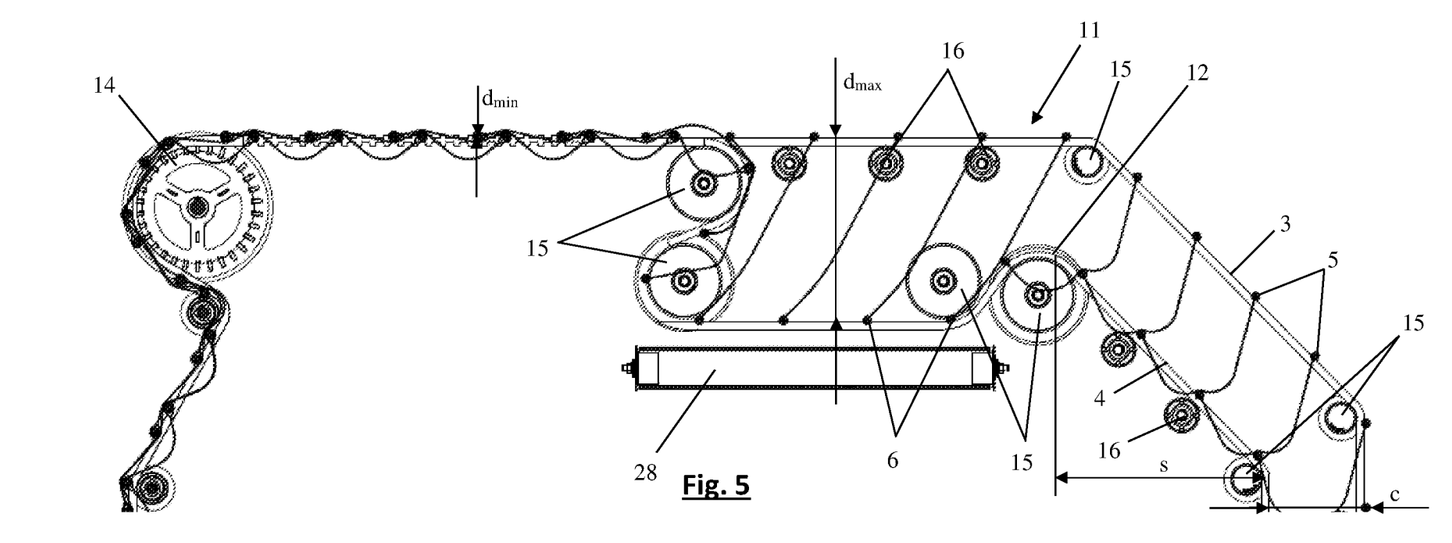
FIG. 5 shows the top part of the ring elevator of FIG. 4 illustrated in more detail.
Figure 6:
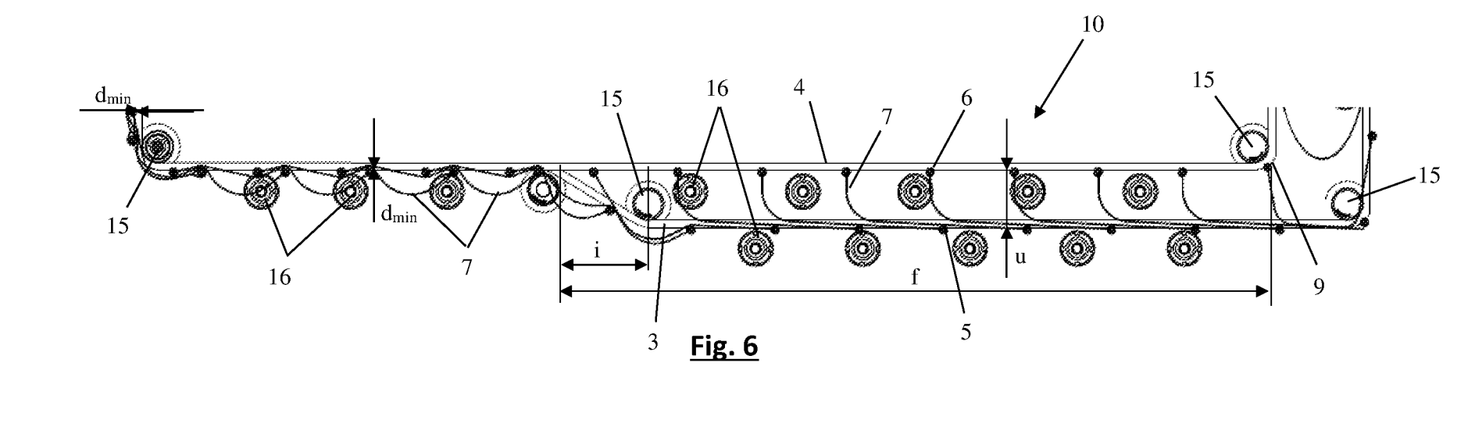
FIG. 6 shows the bottom part of the ring elevator of FIG. 4 illustrated in more detail.

In the illustrated elevator (2) according to at least one embodiment of the invention, as can be seen in FIGS. 4-6:
  between the said descending part (33) and the said ascending part (32), the first strips (3), belts, chains or the like are maximally situated at an underlying distance (u) below the second strips (4), belts, chains or the like;
  in an increasing zone (i) of the paths situated between the descending part (33) and the ascending part (32), starting at a formation distance (f) of the ascending point (9), the distance between the first strips (3), belts, chains or the like and the second strips (4), belts, chains or the like increases from the minimum distance ($d_{min}$) towards the underlying distance (u);

the increasing zone (i) is situated in the paths before the ascending point (9);

in the loading zone (10) the second strips (4), belts, chains or the like descend towards the ascending point (9);

the formation distance (f) is more than half of the distance (W) between the descending part (33) and the ascending part (32);

the length of the increasing zone (i) is about 7.5% of the distance (W) between the descending part (33) and the ascending part (32);

after the ascending part (32), the strips (3, 4), belts, chains or the like keep rising slant towards the unloading zone (11) and in the second path, the second strips (4), belts, chains or the like rise up to an unloading point (12), in such a way that root crops (8) remain in the flexible support elements (7) as long as the second strips (4), belts, chains or the like rise.

Figure 7:
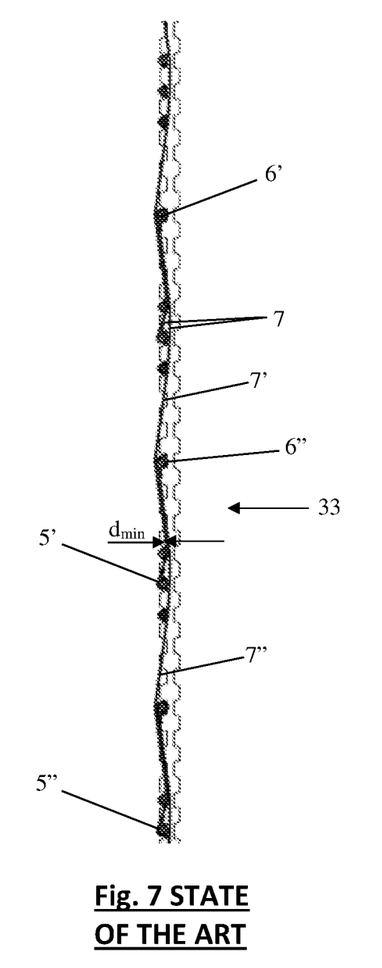
FIG. 7 shows the descending part of the ring elevator of FIG. 2 illustrated in more detail.
Figure 8:
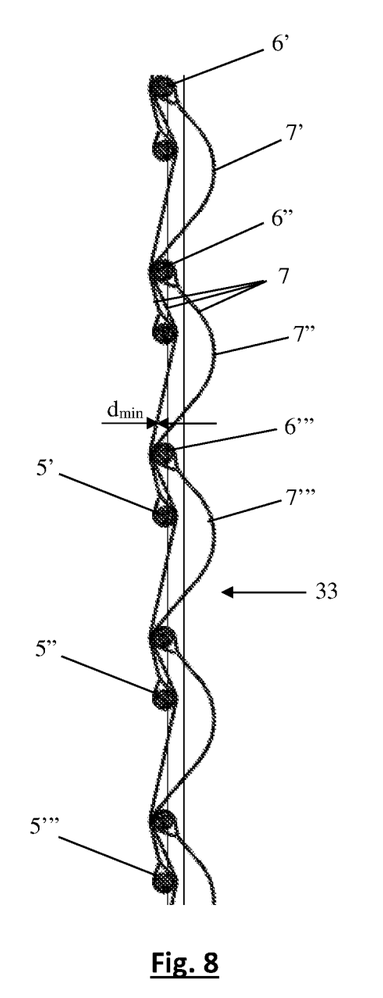
FIG. 8 shows the descending part of the ring elevator of FIG. 4 illustrated in more detail.

As illustrated in FIGS. 7 and 8 in the paths, in zones where the distance between the first strips (3), belts, chains or the like and the second strips (4), belts, chains or the like equals the minimum distance ($d_{min}$), in the ring elevator (2) according to the prior art, two flexible support elements (7', 7") overlap each other over part of their length, whereas in the ring elevator (2) according to at least one embodiment of the invention three flexible support elements (7', 7", 7') overlap each other over part of their length. In the ring elevator (2) according to the prior art, in the mentioned zones, two flexible support elements (7', 7") overlap each other over about 33% of their length, whereas in the illustrated embodiment of the invention, two flexible support elements (7', 7") overlap each other over about 57% of their length.

Figure 9:
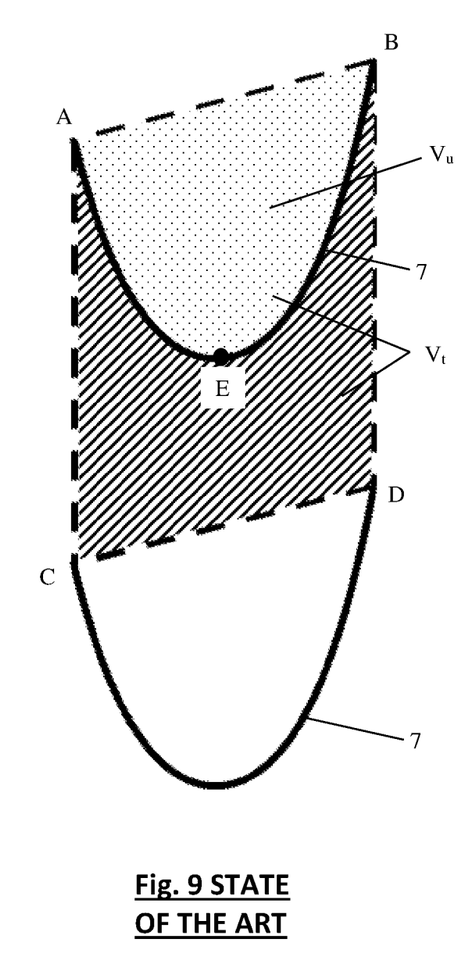
FIG. 9 shows the total volume and the useful volume for a basket of a ring elevator according to the prior art schematically illustrated.
Figure 10:
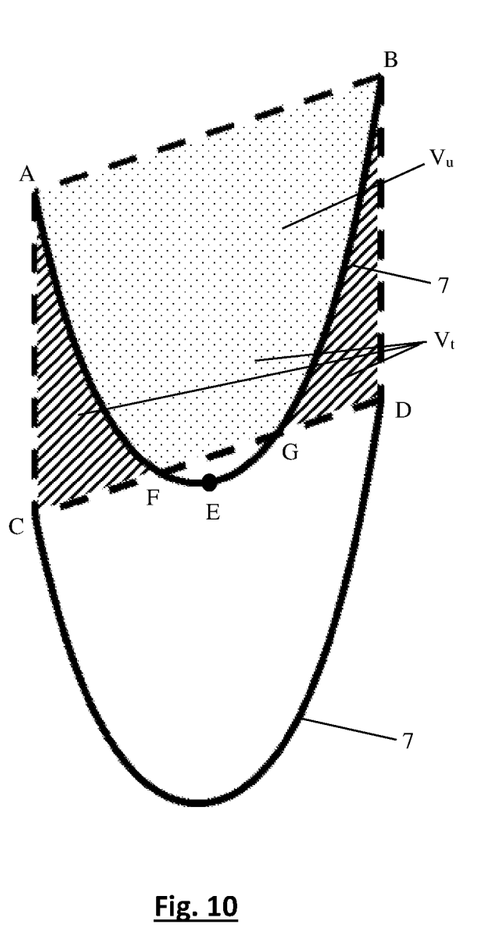
FIG. 10 shows the total volume and the useful volume for a basket of a ring elevator according to some embodiments of the invention schematically illustrated.

In FIGS. 9 and 10, two baskets (7) are illustrated arranged above each other, with the transverse elements (5, 6) to which they are attached placed at said carrier distance (c) from each other and freely hanging down. Points B and D represent the places where first transverse elements (5) are situated and points A and C represent the places where second transverse elements (6) are situated. Seen in cross-section, these baskets (7) then theoretically take up a chain-line.

The total volume ($V_t$) of these baskets (7) then equals the volume between the parallel transverse elements (5, 6), to which these baskets (7) are hung and is illustrated as the area (ABCD) in FIGS. 9 and 10. This is the fully shaded zone in these figures. This total volume is per basket (7) delimited by a plane through the transverse elements (5, 6) to which said basket (7) is attached, a plane through the transverse elements (5, 6) to which the basket (7) hanging just below it is attached, a plane through the first transverse elements (5) to which both said baskets (7) are attached and a plane through the second transverse elements (6) to which both said baskets (7) are attached. In order to calculate this total volume per basket (7), the surface area of area (ABCD) is to be multiplied by the length of the transverse elements (5, 6). With identical baskets (7), this zone also equals the volume delimited between a basket (7), freely hanging downwards, the basket (7) hanging just below it, the plane through the first transvers elements (5) to which these baskets (7) are attached and the plane through the second transverse elements (6) to which these baskets (7) are attached (again the corresponding surface area as illustrated in FIG. 9 multiplied by the length of the transverse elements). The sum of these theoretical total volumes of all the (parts of) baskets (7) extending in said ascending part (32) together form the total volume ($V_t$) in this ascending part (32).

The useful volume ($V_u$) of a basket (7) can be defined as the volume, delimited by said basket (7), freely hanging downwards, a plane through the transverse elements (5, 6) to which this basket (7) is attached and, in case the basket just below it extends up to above the lowest point of this basket hanging down, a plane through the transverse elements (5, 6) to which the basket (7) just below it is attached. In FIG. 9, this is illustrated as the area (ABE). In FIG. 10, this is illustrated as the area (AFGB). These are the punctually shaded zones in these FIGS. 9 and 10. In order to calculate this useful volume per basket (7), the surface area of these areas (ABE, resp. AFGB) is to be multiplied by the length of the transverse elements (5, 6). With identical baskets (7), this theoretical useful volume equals the volume delimited by said basket (7) and a plane through the transverse elements (5, 6) to which this basket (7) is attached, minus the volume which the basket placed just above it and also freely hanging downwards, will occupy therein. The sum of these theoretical useful volumes of all the (parts of) baskets (7) extending within the total volume ($V_t$) together form the useful volume ($V_u$) in this ascending part (32).

Besides said useful volume ($V_u$) there is a volume (illustrated with the diagonally shaded zones in these figures) which is theoretically not finable with root crops (8). According to the prior art, the useful volume ($V_u$) takes up far less than 50% of the total volume ($V_t$). In the illustrated embodiment according to the invention, this useful volume ($V_u$) takes up about 76% of the total volume ($V_t$).

The mentioned volumes ($V_t$, $V_u$) are theoretically defined. For both the total volume ($V_t$) as the useful volume ($V_u$) the illustrated surface areas could alternatively be multiplied by e.g. the length the baskets (7) are taking up in the elevator (2), or e.g. the width over which crops will extend. For the percentages mentioned, it is irrelevant whether in practice the baskets (7) have the same length as the transverse elements (5, 6) or whether the crops occupy this full length. The proportions of the volumes ($V_t$, $V_u$) will remain the same, irrespective of which length is taken for calculating the volumes ($V_t$, $V_u$).

Figure 11:
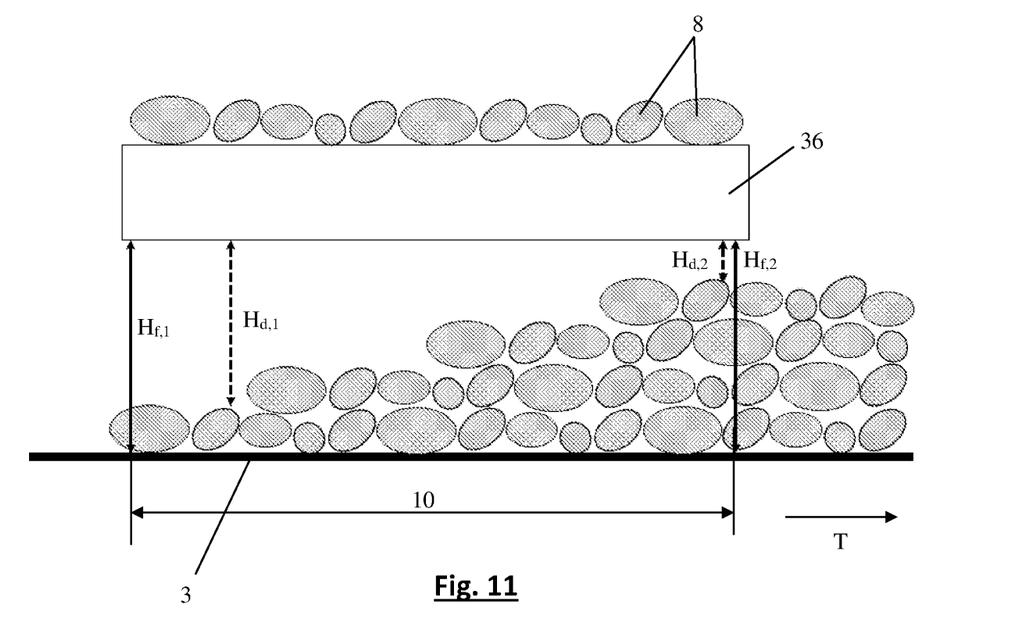
FIG. 11 shows the drop height for a root crop illustrated with both the feeding unit and the loading zone being horizontal.
Figure 12:
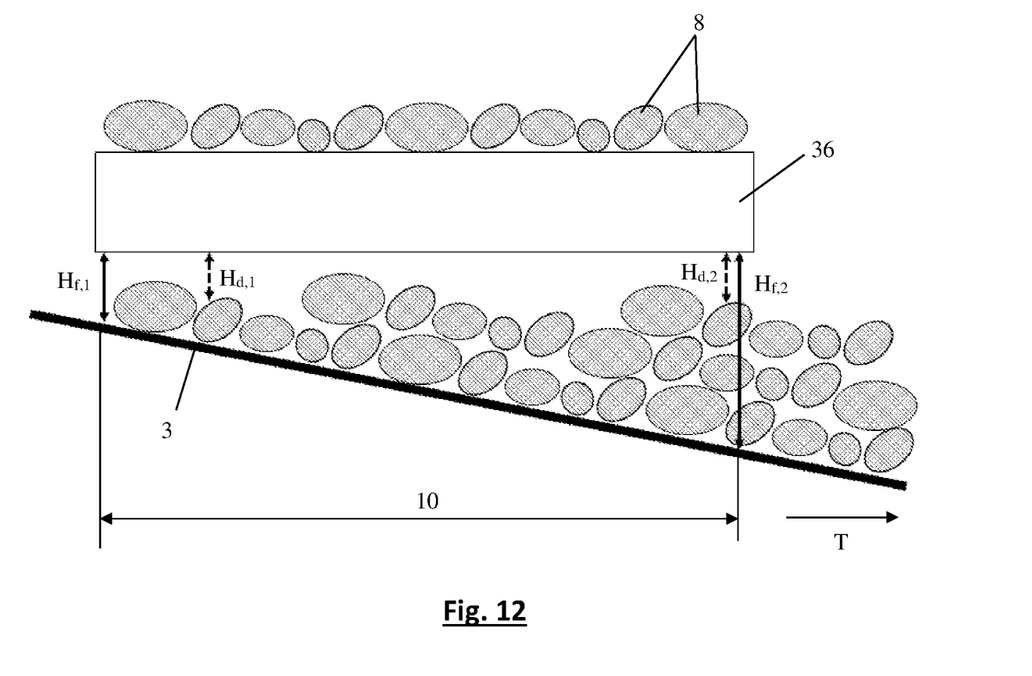
FIG. 12 shows the drop height for a root crop illustrated when the feeding unit is horizontal, but the loading zone is descending.

In FIGS. 11 and 12, the effect of first strips (3), belts, chains or the like descending in the loading zone (10) is illustrated. In these figures the first strips (3), belts, chains or the like run along to the indicated travel direction (T).

The drop height ($D_{h,1}$, $D_{h,2}$) is the height of which a root crop (8) is falling in the air. The filling height ($D_{f,1}$, $D_{f,2}$) is the height between the feeding unit (36) and the underlying part which is not a root crop (8).

In the loading zone (10) of the elevator (2), there are no root crops (8) yet at the left of the feeding unit (36) but at the right, there are root crop (8).

When the feeding unit (36) and the loading zone (10) of first strips (3), belts, chains or the like are both horizontal, as illustrated in FIG. 11 there is a big drop height ($D_{h,1}$) for the root crop (8) at the left of the loading zone (10).

When the feeding unit (36) is horizontal, but the loading zone (10) of first strips (3), belts, chains or the like is descending, as illustrated in FIG. 12, the root crops (8) have almost the same low drop height ($D_{h,1}$, $D_{h,2}$) over the entire loading zone (10).

A similar effect, limiting the drop height can be obtained by setting up the discharge conveyor (28) not parallel to the second strips (4), belts, chains or the like.

The invention claimed is:

1. Ring elevator for lifting root crops in a root crop harvester, the elevator comprising:
a first pair of endless carrying strips, belts, or chains, arranged in parallel, which are drivable over a first closed path;
a second pair of endless carrying strips, belts, or chains, arranged in parallel, which are drivable over a second closed path;
first parallel transverse elements attached between and to the first strips, belts, or chains;
second parallel transverse elements attached between and to the second strips, belts, or chains;
flexible support elements, each attached to one of the first parallel transverse elements and to one of the second parallel transverse elements;
the first strips, belts, or chains being arranged around the second strips, belts, or chains at a distance, which, when in use, varies along the paths between a minimum distance and a maximum distance, and in an ascending part of the paths equals a carrier distance, such that the flexible support elements form baskets for receiving the root crops, wherein in the second path, the second strips, belts, or chains begin to rise towards the ascending part in an ascending point of the second path;
wherein in said ascending part a useful volume in the baskets for receiving the root crops takes up at least 50% of a total volume delimited by the baskets,
wherein the baskets comprise a first basket and a second basket,
wherein the total volume for the first basket is defined by (i) a first plane through the first and the second parallel transverse elements to which the first basket is attached, (ii) a second plane through the first and the second parallel transverse elements to which the second basket is attached, the second basket hanging below the first basket, (iii) a third plane through the first parallel transverse elements to which both the first basket and the second basket are attached, and (iv) a fourth plane through the second parallel transverse elements to which both the first basket and the second basket are attached.

2. Ring elevator according to claim 1, wherein the useful volume takes up between 50% and 76% of the total volume.

3. Ring elevator according to claim 1, wherein in the paths, in zones where the distance between the first strips, belts, or chains and the second strips, belts, or chains equals the minimum distance, one of the flexible support elements is entirely overlapped with others of the flexible support elements.

4. Ring elevator according to claim 1, wherein in a descending part of the paths, the distance between the first strips, belts, or chains and the second strips, belts, or chains equals the minimum distance, that between the said descending part and the said ascending part, the first strips, belts, or chains are maximally situated at an underlying distance below the second strips, belts, or chains and that in an increasing zone of the paths situated between the descending part and the ascending part, the distance between the first strips, belts, or chains and the second strips, belts, or chains, increases from the minimum distance towards the underlying distance.

5. Ring elevator according to claim 4, wherein the increasing zone is starting at a formation distance of the ascending point, this formation distance being at least the length of the carrier distance.

6. Ring elevator according to claim 4, wherein the increasing zone is situated in the paths before the ascending point.

7. Ring elevator according to claim 1, wherein the ring elevator comprises a loading zone, for loading root crops on the flexible support elements, which loading zone is situated before the ascending point and that in at least part of the loading zone the first strips, belts, or chains descend towards the ascending point.

8. Ring elevator according to claim 4, wherein the distance between the first strips, belts, or chains and the second strips, belts, or chains increases gradually in the increasing zone.

9. Ring elevator according to claim 1, wherein the ring elevator comprises an unloading zone, for unloading root crops from the flexible support elements, that in the second path, after said ascending part, the second strips, belts, or chains have a rising slant towards the unloading zone in a slanted zone, wherein the second strips, belts, or chains rise up to an unloading point, in such a way that root crops remain in the flexible support elements as long as the second strips, belts, or chains rise.

10. Ring elevator according to claim 9, wherein a width of the slanted zone is wider than the carrier distance.

11. Ring elevator according to claim 1, wherein all parallel transverse elements have one of said flexible support elements attached thereto.

12. Root crop harvester, comprising a ring elevator for lifting root crops, wherein the ring elevator is a ring elevator according to claim 1.

13. Root crop harvester according to claim 12, wherein the root crop harvester comprises a feeding unit for feeding root crops towards the ring elevator and that in a slope zone at the height of the feeding unit, at least one of the strips, belts, or chains which is situated furthest from the feeding unit is situated lower than a corresponding strip, belt, or chain which is situated closest to the feeding unit.

14. Root crop harvester according to claim 12, wherein the root crop harvester comprises a discharge conveyor for receiving the root crops from the ring elevator and that this discharge conveyor is positioned under an angle with respect to a travel direction of the root crop harvester.

15. Root crop harvester according to claim 12, wherein the root crop harvester comprises a discharge conveyor for receiving the root crops from the ring elevator and feeding these root crops in a discharge direction, wherein seen in the discharge direction at a first side of the ring elevator the discharge conveyor is positioned below the second strips, belts or chains, higher than at the second side of the ring elevator, downstream the first side.

* * * * *